United States Patent
Liu

(10) Patent No.: US 12,090,401 B2
(45) Date of Patent: Sep. 17, 2024

(54) VIRTUAL OBJECT CONTROL METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 287 days.

(21) Appl. No.: 17/588,156

(22) Filed: Jan. 28, 2022

(65) Prior Publication Data

US 2022/0152496 A1 May 19, 2022

Related U.S. Application Data

(63) Continuation of application No. PCT/CN2020/126227, filed on Nov. 3, 2020.

(30) Foreign Application Priority Data

Jan. 8, 2020 (CN) .......................... 202010018370.3

(51) Int. Cl.
*A63F 13/533* (2014.01)
*A63F 13/537* (2014.01)
(Continued)

(52) U.S. Cl.
CPC .......... *A63F 13/533* (2014.09); *A63F 13/537* (2014.09); *A63F 13/837* (2014.09); *A63F 13/92* (2014.09)

(58) Field of Classification Search
None
See application file for complete search history.

(56) References Cited

U.S. PATENT DOCUMENTS

| 5,853,324 A | 12/1998 | Kami et al. |
| 6,267,674 B1 | 7/2001 | Kondo et al. |

(Continued)

FOREIGN PATENT DOCUMENTS

| CN | 103372318 A | 10/2013 |
| CN | 107875629 A | 4/2018 |

(Continued)

OTHER PUBLICATIONS

The European Patent Office (EPO) Extended Search Report for EP Application No. 20911968.4 Sep. 22, 2022 8 Pages.

(Continued)

*Primary Examiner* — Seng H Lim
(74) *Attorney, Agent, or Firm* — ANOVA LAW GROUP, PLLC

(57) ABSTRACT

A virtual object control method includes: displaying a mode selection interface of a shooting game; starting, in response to a selection instruction for a target game mode in the mode selection interface, a game battle of the target game mode, and displaying a battle interface of the game battle; controlling a first virtual object to operate in a virtual environment provided by the game battle; controlling, in response to a shooting instruction for a virtual firearm used by the first virtual object, the virtual firearm to fire a virtual bullet; and determining, when the virtual bullet hits a second virtual object in the game battle, that the second virtual object is switched from a alive state to a death state.

20 Claims, 11 Drawing Sheets

(51) Int. Cl.
*A63F 13/837* (2014.01)
*A63F 13/92* (2014.01)

(56) References Cited

U.S. PATENT DOCUMENTS

| | | | |
|---|---|---|---|
| 8,939,836 B2 | 1/2015 | Wang | |
| 11,850,520 B2* | 12/2023 | Constantin | A63F 13/795 |
| 2007/0024597 A1 | 2/2007 | Matsuoka | |
| 2008/0054570 A1* | 3/2008 | Potterfield | F41J 5/24 |
| | | | 273/408 |
| 2008/0070655 A1* | 3/2008 | Tanabe | A63F 13/24 |
| | | | 463/7 |
| 2012/0142415 A1* | 6/2012 | Lindsay | G06T 19/006 |
| | | | 463/33 |
| 2013/0023314 A1 | 1/2013 | Sumi et al. | |
| 2014/0295941 A1* | 10/2014 | Takahashi | A63F 13/493 |
| | | | 463/24 |
| 2015/0375110 A1* | 12/2015 | Volkov | A63F 13/30 |
| | | | 463/2 |
| 2016/0171835 A1* | 6/2016 | Washington | G07F 17/3223 |
| | | | 463/25 |
| 2017/0282076 A1 | 10/2017 | Tsui et al. | |
| 2021/0038979 A1* | 2/2021 | Bleasdale-Shepherd | |
| | | | G07F 17/3225 |
| 2021/0236931 A1* | 8/2021 | Cox | A63F 13/5375 |

FOREIGN PATENT DOCUMENTS

| | | |
|---|---|---|
| CN | 109529356 A | 3/2019 |
| CN | 110523080 A | 12/2019 |
| CN | 111228812 A | 6/2020 |
| JP | 2018015507 A | 2/2018 |

OTHER PUBLICATIONS

The Japan Patent Office (JPO) Notification of Reasons for Refusal for Application No. 2022-519311 and Translation Feb. 21, 2023 3 Pages.

Wilderness Action Start Guidebook,GZ, Inc.Brain,Apr. 1, 2019, 14-15, 27-29, 34 Pages.

Super Shock Rifle, Unreal wiki [online],Oct. 16, 2018,URL: <https://unreal.fandom.com/wiki/Super_Shock_Rifle?direction=prev&oldid=35823>, [Reiwa (Feb. 21, 2023) date of search].

Instagib, Unreal wiki [online], May 26, 2019, URL: <https://unreal.fandom.com/wiki/Instagibdirection=prev&oldid=38208>,[Reiwa (Feb. 21, 2023) date of search].

The State Intellectual Property Office of the People's Republic of China (SIPO) Office Action 1 for for 202010018370.3 Dec. 3, 2020 13 Pages (including translation).

The World Intellectual Property Organization (WIPO) International Search Report for PCT/CN2020/126227 Feb. 4, 2021 6 Pages (including translation).

Action Game Act, ""Devil May Cry 5" Difficulty Mode Difficulty Introduction + Unlocking Conditions," www.ali213.net, Mar. 19, 2019 (Mar. 19, 2019), Retrieved from the Internet: URL: https://gl.ali213.net/html/2019-3/318395.html, [retrieved on Jan. 25, 2022]. 6 pages.

Silent Nightmare, "One-hit kill is really uncomfortable," baidu.com, Oct. 23, 2018 (Oct. 23, 2018), Retrieved from the Internet: URL: https://tieba.baidu.com/p/5924018931?red-tag=O48742290#, [retrieved on Jan. 25, 2022]. 6 pages.

Elegy of the Moon, "Heroes of the Storm Nova talent plus point detailed guide," gamersky.com, Nov. 1, 2014 (Nov. 1, 2014), Retrieved from the Internet:URL: https://www.gamersky.com/handbook/201411/483729.shtml?tag=wap, [retrieved on Jan. 25, 2022]. 16 pages.

Orange Game Commentary, "Stimulate the battlefield: Zombie mode is launched with "Frozen Bullets", killing zombies can also replenish bullets!," bilibili.com, Apr. 13, 2019 (Apr. 13, 2019), Retrieved from the Internet: URL: https://www.bilibili.com/video/av49175936/. 2 pages.

BBILL1, "Overwatch Deathmatch Mode Details How to Play Overwatch Deathmatch Mode," pc6.com, Aug. 30, 2017 (Aug. 30, 2017), Retrieved from the Internet: URL: http://www.pc6.com/infoview/Article_130676.html, [retrieved on Jan. 25, 2022]. 10 pages.

* cited by examiner

VIRTUAL OBJECT CONTROL METHOD AND APPARATUS, TERMINAL, AND STORAGE MEDIUM

CROSS-REFERENCES TO RELATED APPLICATIONS

This application is a continuation application of PCT Patent Application No. PCT/CN2020/126227, entitled "VIRTUAL OBJECT CONTROL METHOD, DEVICE, TERMINAL, AND STORAGE MEDIUM" and filed on Nov. 3, 2020, which claims priority to Chinese Patent Application No. 202010018370.3, entitled "VIRTUAL OBJECT CONTROL METHOD AND APPARATUS, TERMINAL, AND STORAGE MEDIUM" filed on Jan. 8, 2020, the entire contents of both of which are incorporated herein by reference.

FIELD OF THE TECHNOLOGY

The present disclosure relates to the field of computer and Internet technologies, and in particular, to a virtual object control method and apparatus, a terminal, and a storage medium.

BACKGROUND OF THE DISCLOSURE

At present, shooting games have become more and more popular. In a shooting game, the user controls a virtual object to kill other virtual objects by means of shooting in a virtual environment, thereby winning the game.

In the shooting game, the virtual object may hold a virtual firearm, and the virtual object fires virtual bullets to other virtual objects by using the virtual firearm, to cause damage to other virtual objects. When the virtual object fires a plurality of virtual bullets, and cumulative damage to another virtual object reaches a specified value, the other virtual object is switched from an alive state to a death state.

However, in the above-mentioned related art, when killing another virtual object, the virtual object needs to fire a plurality of virtual bullets, which takes a long time for a game battle and increases a processing overhead of a server.

SUMMARY

Embodiments of the present disclosure provide a virtual object control method and apparatus, a terminal, and a storage medium, which can reduce a game battle duration of a shooting game, thereby reducing a processing overhead of a server. The technical solutions are as follows.

According to an aspect, an embodiment of the present disclosure provides a virtual object control method, applicable to a terminal, the method including: displaying a mode selection interface of a shooting game, the mode selection interface including at least one game mode; starting, in response to a selection instruction for a target game mode in the mode selection interface, a game battle of the target game mode, and displaying a battle interface of the game battle; controlling a first virtual object to operate in a virtual environment provided by the game battle; controlling, in response to a shooting instruction for a virtual firearm used by the first virtual object, the virtual firearm to fire a virtual bullet, a damage value of the virtual bullet being greater than or equal to a hit point value of a virtual object in the game battle; and determining, when the virtual bullet hits a second virtual object in the game battle, that the second virtual object is switched from an alive state to a death state.

According to another aspect, an embodiment of the present disclosure provides a virtual object control apparatus, including: an interface display module, configured to display a mode selection interface of a shooting game, the mode selection interface including at least one game mode; a battle start module, configured to start, in response to a selection instruction for a target game mode in the mode selection interface, a game battle of the target game mode, and display a battle interface of the game battle; an object control module, configured to control a first virtual object to operate in a virtual environment provided by the game battle; a bullet control module, configured to control, in response to a shooting instruction for a virtual firearm used by the first virtual object, the virtual firearm to fire a virtual bullet, a damage value of the virtual bullet being greater than or equal to a hit point value of a virtual object in the game battle; and a state switching module, configured to determine, when the virtual bullet hits a second virtual object in the game battle, that the second virtual object is switched from an alive state to a death state.

According to still another aspect, an embodiment of the present disclosure provides a terminal, including a processor and a memory, one or more programs being stored in the memory. The processor is configured, when executing the one or more programs, to implement the virtual object control method described above.

According to yet another aspect, an embodiment of the present disclosure provides a non-transitory computer-readable storage medium, storing at least one instruction, at least one program, a code set, or an instruction set, the at least one instruction, the at least one program, the code set, or the instruction set being loaded and executed by a processor to implement the virtual object control method described above.

The technical solutions provided in the embodiments of the present disclosure may bring the following beneficial effects:

After entering a game battle of a target game mode, when a virtual bullet fired by a virtual firearm used by a first virtual object hits a second virtual object, it is determined that the second virtual object is switched from an alive state to a death state. In this way, a product function of killing by one shot is achieved, which helps to improve kill efficiency in the game battle, speed up game process, and reduce a game battle duration, thereby reducing a processing overhead of a server.

BRIEF DESCRIPTION OF THE DRAWINGS

To describe the technical solutions in embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

To make the objectives, technical solutions, and advantages of the present disclosure clearer, implementations of the present disclosure are further described below in detail with reference to the accompanying drawings.

Figure 1:
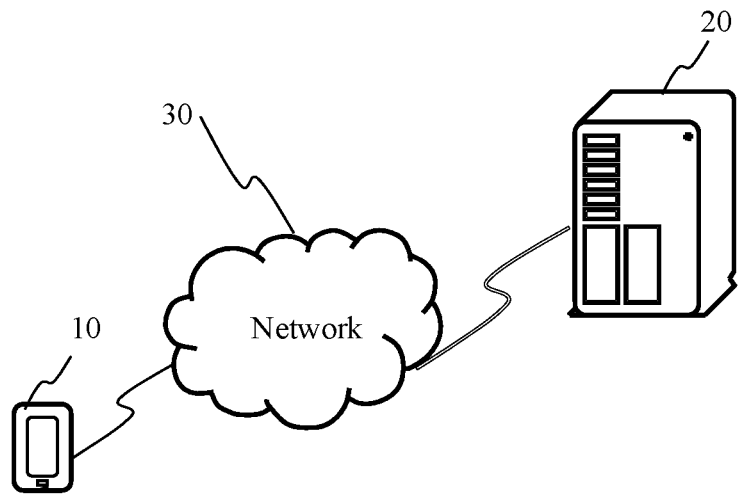
FIG. 1 is a schematic diagram of a game running environment according to an embodiment of the present disclosure.

FIG. 1 shows a schematic diagram of a game running environment according to an embodiment of the present disclosure. The game running environment may include a terminal 10 and a server 20.

The terminal 10 may be an electronic device such as a mobile phone, a tablet computer, a game console, an e-book reader, a multimedia player, a wearable device, or a personal computer (PC). A client of an application (such as a game application) may be installed on the terminal 10.

In embodiments of the present disclosure, the application refers to a shooting game application. The shooting game application can provide a virtual environment, such that a virtual character played and operated by a user to perform activities in the virtual environment, such as walking and shooting. Typically, the shooting game application may be a third-personal shooting (TPS) game, a first-person shooting (FPS) game, a multiplayer online battle arena (MOBA) game, a multiplayer gunfight survival game, or the like. In addition, virtual objects provided in different applications have different forms and corresponding functions, which may be preset according to an actual requirement, which is not limited in the embodiments of the present disclosure.

The virtual environment is a scene displayed (or provided) when a client of an application (such as a game application) runs on a terminal. The virtual environment refers to a scene created for a virtual object to perform activities (such as game competition), for example, a virtual house, a virtual island, or a virtual map. The virtual environment may be a simulated environment of a real world, or may be a semi-simulated and semi-fictional environment, or may be a completely fictional environment. The virtual environment may be a two-dimensional virtual environment, a 2.5-dimensional virtual environment, or a three-dimensional virtual environment, which is not limited in the embodiments of the present disclosure.

The virtual object is a virtual character controlled by a user account in an application. For example, the application is a game application. The virtual object is a game character controlled by the user account in the game application. The virtual object may be in a human form or animal, cartoon, or other forms, which is not limited in the embodiments of the present disclosure. The virtual object may be presented in a three-dimensional form or a two-dimensional form, which is not limited in the embodiments of the present disclosure. In some embodiments, when the virtual environment is a three-dimensional virtual environment, the virtual object is a three-dimensional model created based on a skeletal animation technology. Each virtual object has a shape and size in the three-dimensional virtual environment, and occupies some space in the three-dimensional virtual environment.

The server 20 is configured to provide a back-end service to a client of an application in the terminal 10. For example, the server 20 may be a back-end server of the application. The server 20 may be one server, a server cluster including a plurality of servers, or a cloud computing service center. In some embodiments, the server 20 simultaneously provides a back-end service to applications in a plurality of terminals 10.

The terminal 10 may communicate with the server 20 through a network 30. The network 30 may be a wired network or a wireless network.

In some embodiments, the terminal 10 includes at least a first terminal and a second terminal. In the embodiments of the present disclosure, clients running the same application may be installed in the first terminal and the second terminal. The client in the first terminal is referred to as a first client, and the client in the second terminal is referred to as a second client. A login user account in the first client is recorded as a first user account, and a login user account in the second client is recorded as a second user account. A virtual object controlled by the first client is referred to as a first virtual object, and a virtual object controlled by the second client is referred to as a second virtual object, where the first virtual object and the second virtual object have a hostile relationship.

The hostile relationship refers to virtual objects in different camps (or groups). Exemplarily, there are 100 users participating in the same game battle, and the 100 users may form a plurality of different groups, for example, each group may have at most four users. Virtual objects controlled by users in the current group have a hostile relationship with virtual objects controlled by users in other groups. Exemplarily, ten users participate in a matching game, and are divided into two teams: a red team and a blue team, that is, every five users form a group. At this time, virtual objects in the red team and virtual objects in the blue team have a hostile relationship.

In the method embodiments of the present disclosure, an entity executing each step may be a terminal, for example, the client of the application run on the terminal. In some embodiments, the application is an application developed based on a three-dimensional virtual environment engine. For example, the virtual environment engine is a Unity engine, and the virtual environment engine may construct three-dimensional virtual environments, virtual objects, virtual props, and the like, to bring more immersive experience to the users.

Figure 2:
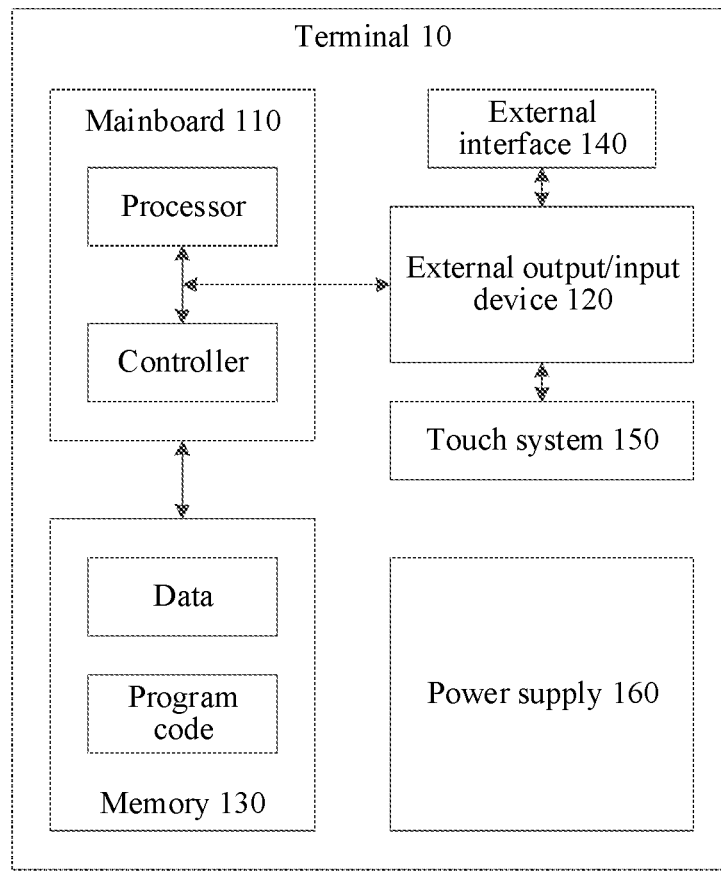
FIG. 2 is a schematic structural diagram of a terminal according to an embodiment of the present disclosure.

FIG. 2 shows a schematic structural diagram of a terminal according to an embodiment of the present disclosure. The terminal 10 may include a mainboard 110, an external output/input device 120, a memory 130, an external interface 140, a touch system 150, and a power supply 160.

Processing elements such as a processor and a controller are integrated in the mainboard 110.

In some embodiments, the external output/input device 120 of the terminal may include a display component (for example, a display screen), a sound playback component (for example, a speaker), a sound collecting component (for example, a microphone), and various buttons. The external output/input device 120 of the PC terminal may include a display component (for example, a display screen), a sound playback component (for example, a speaker), a sound collecting component (for example, a microphone), and various buttons (for example, a mouse and a keyboard).

The memory 130 stores program code and data.

The external interface 140 may include an earphone interface, a charging interface, a data interface, and the like.

The touch system 150 may be integrated in the display component or the buttons of the external output/input device 120, and the touch system 150 is configured to detect touch operations performed by a user on the display component or the buttons.

The power supply 160 is configured to supply power to other components in the terminal 10.

In the embodiments of the present disclosure, the processor in the mainboard 110 may generate a user interface (UI) (for example, a game interface) by executing or calling the program code and the data stored in the memory, and present the generated UI (for example, the game interface) by using the external output/input device 120. During presentation of the UI (for example, the game interface), a touch operation performed during interaction between the user and the UI (for example, the game interface) may be detected through the touch system 150, and a response is made to the touch operation.

Figure 3:
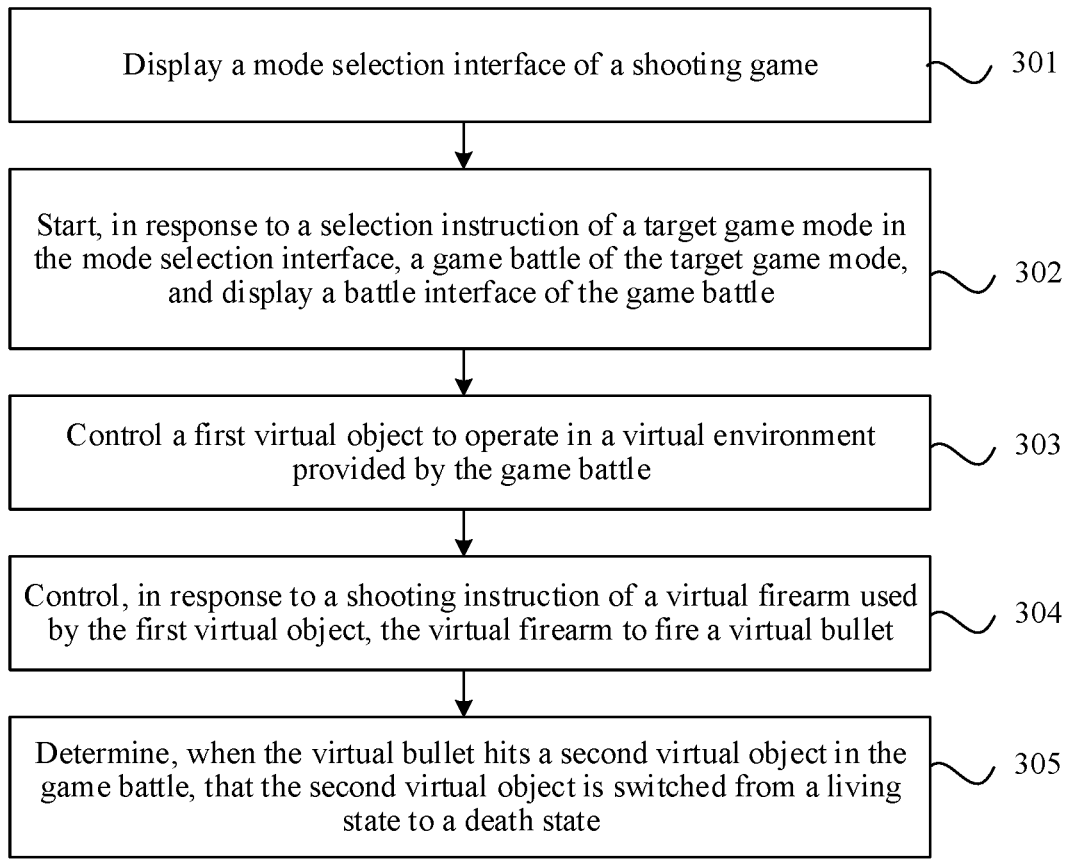
FIG. 3 is a flowchart of a virtual object control method according to an embodiment of the present disclosure.

FIG. 3 shows a flowchart of a virtual object control method according to an embodiment of the present disclosure. The method may be applied to the game running environment of the terminal 10 shown in FIG. 1, for example, an entity executing each step may be a client of the application installed on the terminal 10 (hereinafter referred to as the "client"). The method may include the following steps (301 to 305):

Step 301: Display a mode selection interface of a shooting game.

The shooting game refers to a battle game in which a user is provided with a virtual firearm as a virtual weapon in a game battle. The user may control a virtual object to use the virtual firearm to attack other virtual objects. The mode selection interface is used for presenting the game mode provided by the shooting game. In some embodiments, the mode selection interface includes at least one game mode. For example, a plurality of game modes are provided for user selection, and different game modes correspond to different game playing methods and rules.

Figure 4:
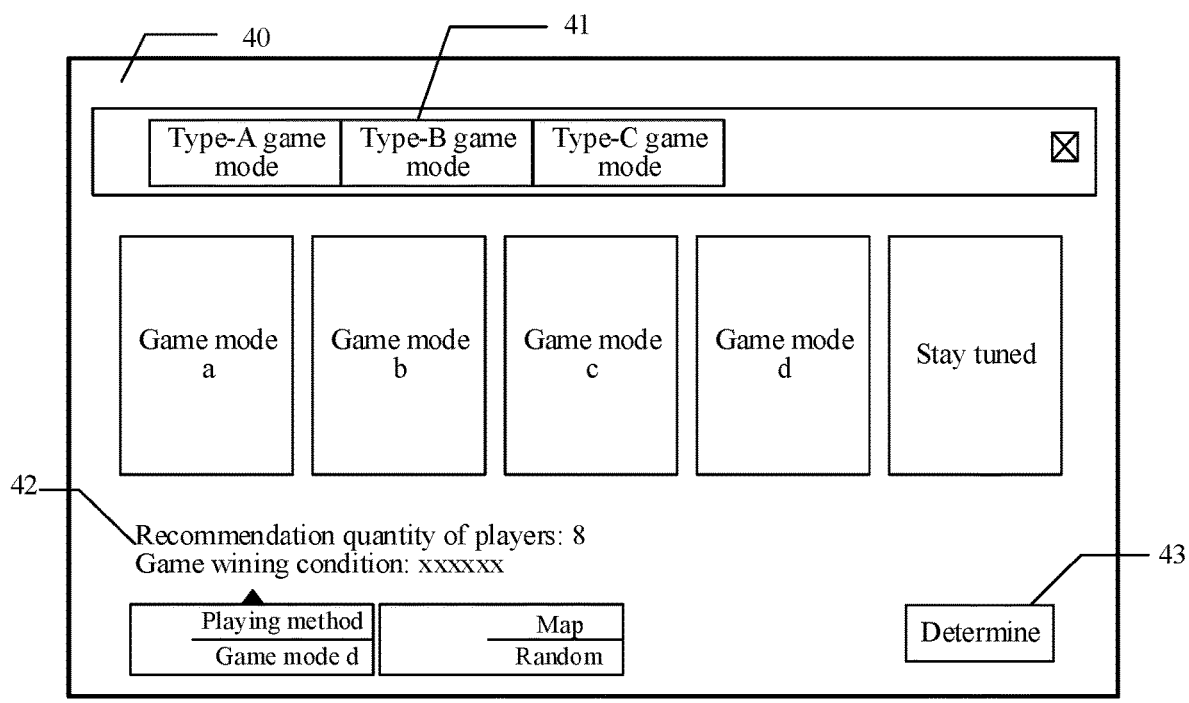
FIG. 4 is an exemplary schematic diagram of a selection interface of a game mode.

In the embodiments of the present disclosure, when a user starts a game, the client displays the mode selection interface of the shooting game. Further, the client starts a game battle by obtaining a selection instruction of the user, and displays a battle interface of the game battle. In some embodiments, the mode selection interface further includes: game mode classification, game modes, playing methods and rules, and the like. Exemplarily, referring to FIG. 4, game mode classification 41 is displayed in a mode selection interface 40, and the game mode classification 41 includes a type-A game mode, a type-B game mode, and a type-C game mode. The type-B game mode includes a game mode a, a game mode b, a game mode c and a game mode d. When the user clicks the game mode d, the mode selection interface 40 displays a game rule 42 corresponding to the game mode d. In some embodiments, the game rule 42 includes a recommended number of players and a game playing method, and the game playing method is used for prompting the user how to win the game.

Step 302: Start, in response to a selection instruction for a target game mode in the mode selection interface, a game battle of the target game mode, and display a battle interface of the game battle.

The selection instruction is an operation instruction for selecting the target game mode from at least one game mode provided by the mode selection interface. In some embodiments, the selection instruction may be triggered to be generated by the user. For example, the user may click an option corresponding to the target game mode in the mode selection interface, to trigger to generate the selection instruction corresponding to the target game mode.

The game battle refers to an interactive game environment corresponding to the target game mode. A game battle usually takes a certain duration. In a game battle of a shooting game, a virtual object may attack other virtual objects through a virtual firearm, to win the game battle. The battle interface refers to a UI used to present a virtual environment of the game battle to the user. The battle interface may include a display screen of the virtual environment, for example, elements in the virtual environment, such as virtual buildings, virtual props, virtual objects, and the like. In some embodiments, the battle interface further includes some operation controls such as buttons, sliders, and icons for the user to operate. In some embodiments, in the embodiments of the present disclosure, the battle interface may further include virtual objects and virtual firearms used by the virtual objects.

In the embodiments of the present disclosure, the user may select the target game mode in the mode selection interface, to start the game battle. In some embodiments, the user clicks the target game mode, to trigger to generate the selection instruction corresponding to the target game mode. Further, after the selection instruction is received, the client may start the game battle of the target game mode according to the selection instruction, and display the battle interface of the game battle. Exemplarily, referring to FIG. 4 and FIG. 5, by using a first-person shooting game as an example, by clicking the game mode d in FIG. 4, the user triggers to generate a selection instruction for the game mode d. The client starts a game battle of the game mode d according to the selection instruction, and displays a battle interface 50 of the game battle. In some embodiments, the battle interface 50 may display a game rule 51 in the game battle, to prompt the user how to win the game battle.

In the embodiments of the present disclosure, when the game battle in the target game mode is started, a server may allocate a virtual weapon to each virtual object in the game battle, and the virtual weapon may be a virtual firearm. In some embodiments, after step 302, the method further includes the following sub-steps:

1. Receive firearm configuration information transmitted by the server.
2. Determine a virtual firearm used by a first virtual object according to the firearm configuration information.

The firearm configuration information refers to related information that the virtual firearm is configured for the corresponding virtual object. For example, the firearm configuration information transmitted by the server to the client corresponding to the first virtual object is used for designating the virtual firearm used by the first virtual object in the game battle. In some embodiments, the firearm configuration information includes identification information of the virtual firearm. After the firearm configuration information is received, the client may determine the virtual firearm of the first virtual object according to the firearm configuration information, and display the virtual firearm used by the first virtual object in the battle interface, for example, a virtual firearm 52 in FIG. 5.

In the embodiments of the present disclosure, the server may configure a virtual firearm for each virtual object in the game battle. In a possible implementation, each virtual object in the game battle is configured to use the same virtual firearm. In this way, each virtual object participating in the same game battle is configured to use the same virtual firearm, which helps to ensure fairness of the game. In another possible implementation, at least two virtual objects in the game battle are configured to use different virtual firearms. In this way, the first virtual object may kill a second virtual object and snatch a virtual firearm used by the second virtual object, thereby making the game more diversified and strategic. The first virtual object and the second virtual object have a hostile relationship.

Descriptions about virtual weapons configured by the server are only exemplary and explanatory. During actual application, the client may alternatively configure one or more other virtual weapons for the virtual objects in the game battle, such as virtual daggers, virtual explosives, and the like.

Step 303: Control the first virtual object to operate in the virtual environment provided by the game battle.

The first virtual object refers to a user-controlled virtual object that can interact with the virtual environment. In some embodiments, in the embodiments of the present disclosure, after the client starts the game battle of the target game mode, the user may operate an operation control in the battle interface to generate a corresponding touch operation instruction. Further, the client controls the first virtual object to operate in the virtual environment provided by the game battle according to the touch operation instruction.

Figure 5:
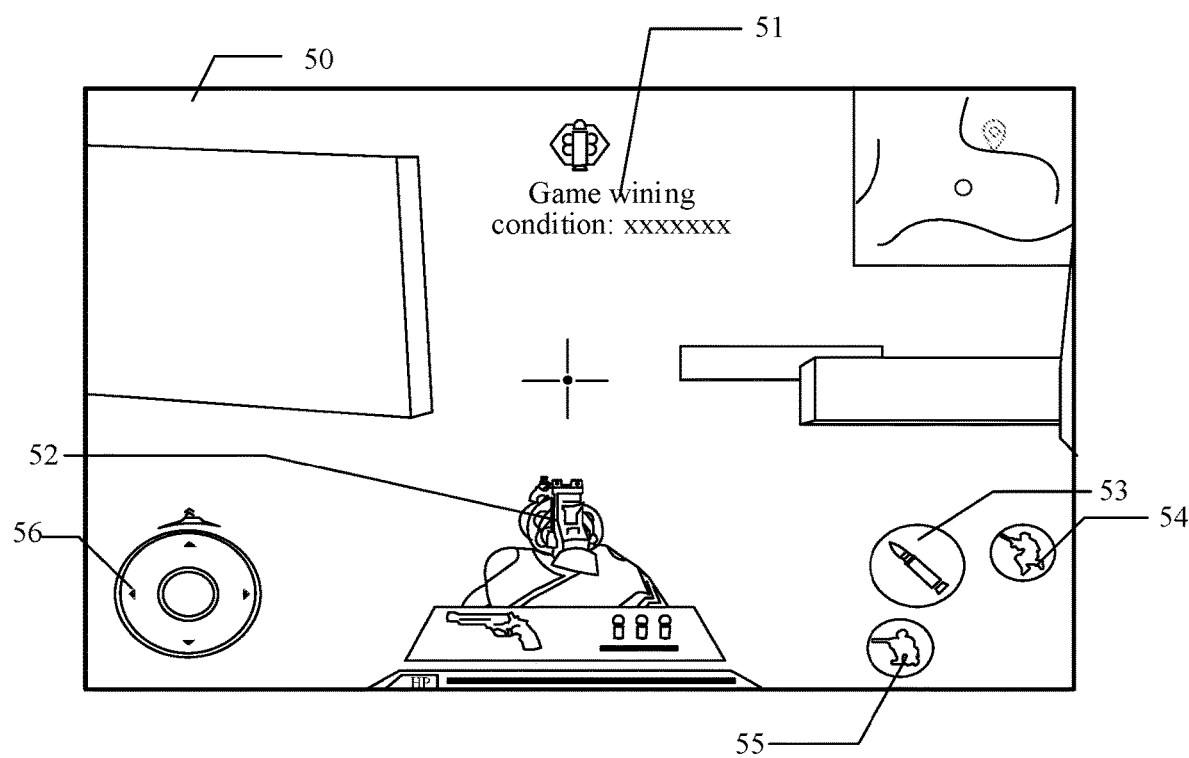
FIG. 5 is an exemplary schematic diagram of a game battle interface.

Exemplarily, referring to FIG. 5, the battle interface 50 includes an operation control A 53, an operation control B 54, an operation control C 55, and an operation control D 56. The operation control A 53, the operation control B 54, and the operation control C 55 are skill operation controls of the first virtual object, and the user may click a corresponding operation control, to control the first virtual object to cast a corresponding skill in the virtual environment. The operation control D 56 is a movement operation control of the first virtual object, and the user may slide the operation control D 56, to control the first virtual object to move in the virtual environment.

Step 304: Control, in response to a shooting instruction for the virtual firearm used by the first virtual object, the virtual firearm to fire a virtual bullet.

The virtual firearm refers to an offensive virtual prop used by a virtual object. The virtual bullet refers to a virtual prop equipped on the virtual firearm and used for attacking or damaging virtual objects other than the virtual object using the virtual firearm. The shooting instruction refers to a control instruction used for triggering the virtual firearm used by the virtual object to fire the virtual bullet. In some embodiments, the shooting instruction is triggered to be generated by the user. For example, the user may click an operation control corresponding to the shooting instruction in the battle interface to trigger to generate the shooting instruction. For another example, the user may alternatively press a corresponding key (such as an R key) on a keyboard to trigger to generate the shooting instruction. The key refers to a key corresponding to the operation control corresponding to the shooting instruction. In some embodiments, the key may be set according to personal habits of the user.

In the embodiments of the present disclosure, the user may click the operation control corresponding to the shooting instruction to trigger to generate the shooting instruction. Further, after the shooting instruction is received, the client may control the first virtual object to use the virtual firearm to fire the virtual bullet according to the shooting instruction. In the embodiments of the present disclosure, a damage value of the virtual bullet is greater than or equal to a hit point (HP) value of a virtual object in the game battle. HP value of a virtual object indicates a health of the virtual object in the game battle. A positive HP value indicates that the virtual object is alive or active, and when the HP value drops to or under 0, the virtual object is dead or loses consciousness. The HP value may decrease due to various game events, such as the virtual character being hit by a firearm, the HP value being exchanged for another game ability, the virtual character keeping moving for a certain time or a distance, etc. In some embodiments, the damage value of the virtual bullet is greater than or equal to a hit point value of any virtual object in the game battle. In other words, when each virtual object in the game battle has the same hit point value, which is referred to as a first hit point value, the damage value of the virtual bullet is greater than or equal to the first hit point value; and when the virtual objects in the game battle have different hit point values and a hit point value of a virtual object with a highest hit point value is referred to as a second hit point value, the damage value of the virtual bullet is greater than or equal to the second hit point value. In other words, when the virtual bullet hits the second virtual object in the game battle, a hit point value of the second virtual object is reset to zero, that is, the second virtual object is killed. In addition, a kill quantity of the first virtual object in the game battle is increased. The second virtual object may be any virtual object other than the first virtual object in the game battle, and the second virtual object has a hostile relationship with the first virtual object.

The virtual bullet is equipped by the client while configuring the virtual firearm for the first virtual object at the beginning of the game battle. In a possible implementation, a quantity of virtual bullets equipped on the virtual firearm is limited, which may be 1, 2, 3, 4, or the like, and is not limited in the embodiments of the present disclosure.

In a possible implementation, a response condition of the shooting instruction is that an available quantity of virtual bullets of the virtual firearm is not zero. In some embodiments, after the shooting instruction is received, the client may detect whether the available quantity of virtual bullets of the virtual firearm is zero. When the available quantity of virtual bullets is not zero, the client responds to the shooting instruction; and when the available quantity of virtual bullets is zero, the client does not respond to the shooting instruction.

In another possible implementation, the response condition of the shooting instruction is that a time interval between a moment at which a previous virtual bullet is fired from the virtual firearm and a moment at which the current shooting instruction is received meets a preset duration. In some embodiments, after the shooting instruction is received, the client may obtain an interval duration between the moment at which the shooting instruction is received and the moment at which the previous virtual bullet is fired. When the interval duration is greater than the preset duration, the step of the responding to the shooting instruction is performed, and the client controls, in response to the shooting instruction for the virtual firearm used by the first virtual object, the virtual firearm to fire the virtual bullet. That is, each time a shooting instruction is triggered, only one virtual bullet can be fired, and a plurality of virtual bullets cannot be continuously fired. When the interval duration is less than or equal to the preset duration, the client does not respond to the shooting instruction. The preset duration may be 1 s, 2 s, or 3 s, which is not limited in the embodiments of the present disclosure. The preset duration is less than a duration of automatic recovery of virtual bullets.

Certainly, in other possible embodiments, the response condition of the shooting condition may be that the available quantity of virtual bullets of the virtual firearm is not zero, and the time interval between the moment at which the previous virtual bullet is fired and the moment at which the current shooting instruction is received meets the preset duration. In some embodiments, when the client detects whether the available quantity of virtual bullets of the virtual firearm is zero after the shooting instruction is received, the interval duration between the moment at which the previous virtual bullet is fired and the moment at which the current shooting instruction is received may be obtained. When the available quantity of virtual bullets is not zero and the time interval is greater than the preset duration, the client responds to the shooting instruction; and when the available quantity of virtual bullets is zero or the time interval is less than or equal to the preset duration, the client does not respond to the shooting instruction.

In some embodiments, when the client does not respond to the shooting instruction, the client may display first prompt information in the battle interface, and the first prompt information is used for prompting the user that no attack using virtual bullets is allowed currently. In some embodiments, the first prompt information may include a condition under with virtual bullets are allowed to be used, for example, "an attack using virtual bullets is allowed n minutes later".

Step 305: Determine, when the virtual bullet hits the second virtual object in the game battle, that the second virtual object is switched from an alive state to a death state.

The alive state refers to a state in which a hit point value of a virtual object in a game battle is not zero. In some embodiments, by using the first virtual object as an example, when the first virtual object is in the alive state, the user may control the first virtual object to perform interactive operations on the virtual environment or the second virtual object. The death state refers to a state in which the hit point value of the virtual object in the game battle is zero. In some embodiments, by using the first virtual object as an example, when the first virtual object is in the death state, the user cannot control the first virtual object to perform interactive operations. In some embodiments, under the death state, the user may freely switch a perspective to observe the game battle.

In the embodiments of the present disclosure, the damage value of the virtual bullet is not less than the hit point value of the virtual object. Therefore, for example, in the case that the virtual bullet hits the second virtual object in the game battle, the client may determine that the second virtual object is switched from the alive state to the death state. Exemplarily, referring to FIG. 6, in a battle interface 60, a second virtual object 61 is in the alive state, the user clicks the operation control A 53 to trigger to generate a shooting instruction, and the client controls the first virtual object to use the virtual firearm 52 to fire a virtual bullet according to the shooting instruction. When the virtual bullet hits the second virtual object 61, the battle interface 60 is switched to a battle interface 62. The second virtual object 61 is in the death state in the battle interface 62.

In some embodiments, the client may determine whether the second virtual object is hit by the virtual bullet by transmitting a detection ray. In the embodiments of the present disclosure, a collision box is disposed on or around the second virtual object, and the collision box is used for detecting whether the virtual object is attacked. The collision box may be cuboidal, cylindrical, spherical, or the like, which is not limited in the embodiments of the present disclosure. In some embodiments, the client may control the first virtual object to transmit the detection ray from a designated position, where the designated position may be a position from which the virtual bullet is fired, for example, a muzzle of the virtual firearm used by the first virtual object, and a trajectory of the detection ray overlaps with a movement trajectory of the virtual bullet. In a possible implementation, when the client receives the shooting instruction, when the detection ray intersects the collision box of the second virtual object, it is determined that the second virtual object is hit by the virtual bullet.

Figure 7:
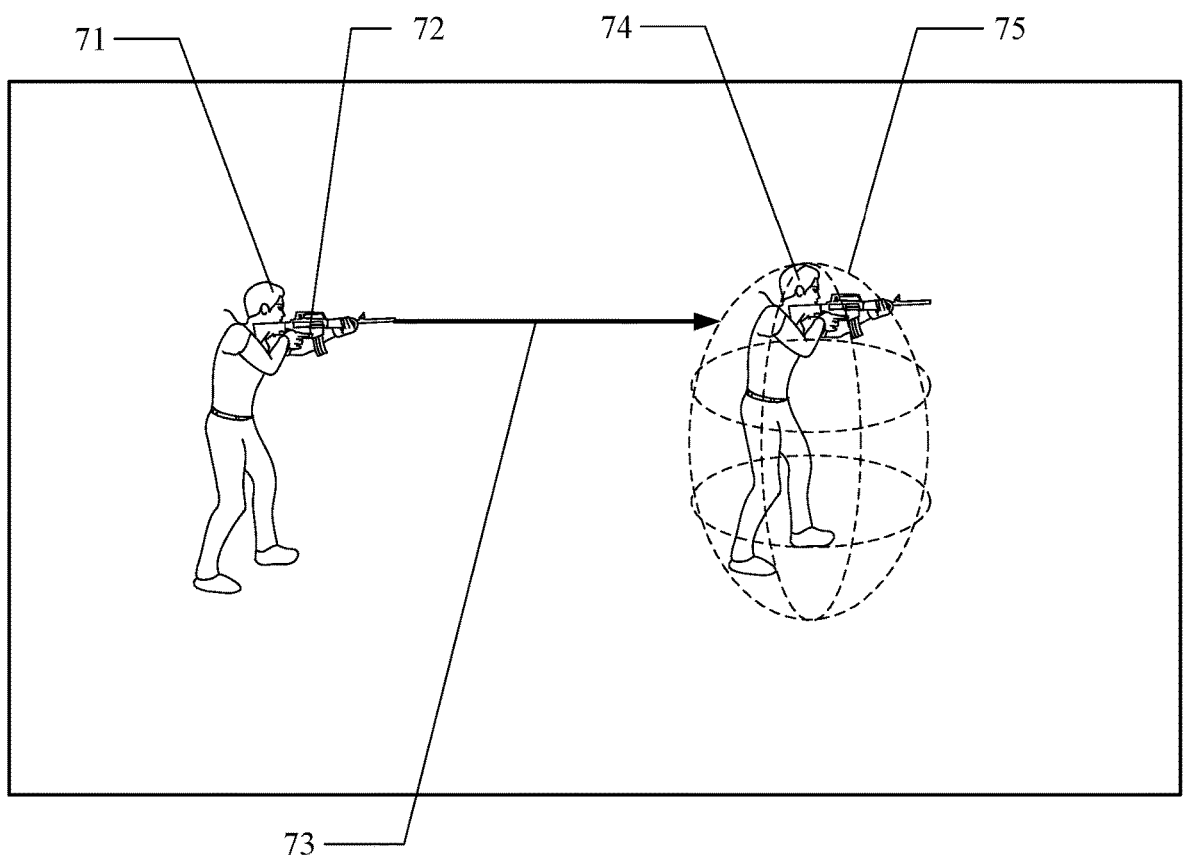
FIG. 7 is an exemplary schematic diagram of a method for determining whether a virtual bullet hits a target.

Exemplarily, referring to FIG. 7, a detection ray 73 is transmitted in real time, where a muzzle of a virtual firearm 72 used by a first virtual object 71 is used as a start point, and a collision box 75 is disposed on a second virtual object 74. When the client receives the shooting instruction, when the detection ray 73 intersects the collision box 75, it is determined that the second virtual object 74 is hit by a virtual bullet, and the second virtual object 74 is controlled to be switched from an alive state to a death state.

A size of the collision box may be set by the server. In a possible implementation, when any part of the second virtual object is hit by the virtual bullet, the second virtual object is switched from the alive state to the death state. In some embodiments, the size of the collision box is large enough to cover all body parts of the second virtual object; or, a quantity of collision boxes is sufficient to cover all body parts of the second virtual object. In another possible implementation, when a specific part of the second virtual object is hit by the virtual bullet, the second virtual object is switched from the alive state to the death state. In some embodiments, the collision box only covers the specific part, and the specific part may be a head, chest, abdomen, or the like of the second virtual object.

In some embodiments, in the embodiments of the present disclosure, the virtual bullet has penetrability. The penetrability means that the virtual bullet may penetrate the second virtual object and continue to fly after hitting the second virtual object. In some embodiments, after the virtual bullet hits the second virtual object, the client may control the virtual bullet to penetrate the second virtual object, to continuously move in a designated direction; and control the virtual bullet to stop moving when a moving state of the virtual bullet meets a condition.

The condition refers to a limitation condition of determining whether to stop the virtual bullet. In a possible embodiment, the condition refers to a flying distance of the virtual bullet. In some embodiments, the flying distance may be set by the server. After the virtual bullet hits the second virtual object, the client may control the virtual bullet to continuously move in the designated direction; and when a moving distance of the virtual object reaches the flying distance, the client controls the virtual bullet to stop flying.

In another possible embodiment, the condition means that the virtual bullet hits a virtual obstacle, for example, a virtual tree, a virtual building, a virtual wall, or the like. In some embodiments, after the virtual bullet hits the second virtual object, the client may control the virtual bullet to continuously move in the designated direction; and when the virtual bullet hits the virtual obstacle, the client controls the virtual bullet to stop flying.

In still another possible implementation, the condition means that the virtual bullet hits n second virtual objects in the flying distance. In some embodiments, n may be 2, 3, 4, or the like. After the virtual bullet hits the second virtual object, the client may control the virtual bullet to continuously move in the designated direction; and when the virtual object continuously hits the n second virtual objects, the client controls the virtual bullet to stop flying.

In conclusion, in the technical solution provided in the embodiments of the present disclosure, after entering a game battle of a target game mode, when a virtual bullet fired by a virtual firearm used by a first virtual object hits a second virtual object, it is determined that the second virtual object is switched from an alive state to a death state. In this way, a product function of killing by one shot is achieved, which helps to improve kill efficiency in the game battle, speed up game process, and reduce a game battle duration, thereby reducing a processing overhead of a server.

In addition, a damage value of the virtual bullet is set to be greater than or equal to a hit point value of each virtual object in the game battle, which achieves a product function of killing by one shot (namely, "one-hit kill") without changing other code logic of the game application, thereby significantly reducing development costs of new game modes. For example, the game application originally includes a game mode of regular shooting, where every firearm available to be used by a game character may be set with different damage values, the different damage values may be less than HP value of a virtual game character, and the virtual game character may be hit by a firearm one or more times before turning to the death state (HP value drops to or below zero). The original code logic corresponding to the regular shooting mode includes: when a virtual character is hit by a virtual bullet of a firearm, reducing HP value of the virtual character by an amount of a damage value corresponding to the firearm. In one example, after taking a hit by a firearm with damage value less than the current HP value, the virtual game character is still alive with reduced HP value, and may be able to replenish their reduced HP value by using a healing virtual object such as medicine or bandage. In another example, after taking a hit by a firearm with damage value greater than or equal to the current HP value, the virtual game character is switched to the death state. In some embodiments, the game application provides the regular shooting mode and the one-hit kill mode for user selection. When the user selects the regular shooting mode, the game application sets virtual bullets of firearms in the game with different damage values based on their attributes, and implements the original code logic corresponding to the regular shooting mode; and when the user selects the one-hit kill mode, the game application sets a damage value of a virtual bullet of all firearms to be a same value greater than or equal to a hit point value of virtual game characters and executes the same original code logic corresponding to the regular shooting mode. In this way, deploy size of the game application (i.e., file size of the game application when installed on a local device) and resource consumption (i.e., computation overhead when executing the game application) are reduced comparing to developing a new set of game logic for the additional game mode of the game application. On the other hand, the game users are provided with graphical interfaces that indicate different game modes and game experiences.

In the embodiments of the present disclosure, a quantity of virtual bullets equipped by the client while configuring the virtual firearm for the first virtual object is limited. In some embodiments, the virtual bullets may be automatically recovered after consumed. A recovery method of the virtual bullets is introduced below.

In an exemplary embodiment, after step 304, the method further includes the following sub-steps:

1. Control, when the virtual bullet hits a second virtual object in the game battle, an available quantity of virtual bullets equipped on the virtual firearm to be increased by a first value after a first duration.

The first duration refers to a recovery duration of the available quantity of virtual bullets after the client receives a shooting instruction or the first virtual object consumes a virtual bullet to successfully kill the second virtual object. The first value refers to a recovery quantity of virtual bullets.

In some embodiments, in the embodiments of the present disclosure, when the first virtual object consumes the virtual bullet and the virtual bullet hits the second virtual object in the game battle, the client may control the available quantity of virtual bullets equipped on the virtual firearm used by the first virtual object to be increased by the first value after the first duration. The first duration may be 0.050 s, 0.066 s, 0.080 s, or the like, and the first value may be 1, 2, 3, or the like. The first value is less than an upper limit value of the available quantity of virtual bullets equipped on the virtual firearm. The upper limit value may be set by the server to 3, 4, 5, or the like, which is not limited in the embodiments of the present disclosure.

2. Control, when the virtual bullet does not hit the second virtual object in the game battle, the available quantity of virtual bullets equipped on the virtual firearm to be increased by a second value after a second duration.

The second duration refers to a recovery duration of the available quantity of virtual bullets after the client receives the shooting instruction. The second value refers to a recovery quantity of virtual bullets. The second duration is greater than the first duration.

In some embodiments, in the embodiments of the present disclosure, when the first virtual object consumes the virtual bullet and the virtual bullet does not hit the second virtual object in the game battle, the client may control the available quantity of virtual bullets equipped on the virtual firearm used by the first virtual object to be increased by the second value after the second duration. The second duration may be 1 min, 3 min, 5 min, or the like, and the second value may be 1, 2, 3, or the like. The second value is less than the upper limit value of the available quantity of virtual bullets equipped on the virtual firearm. In a possible implementation, the second value is equal to the first value. In some embodiments, both the second value and the first value are 1.

In an example, the first duration is 0 and the first value is 1, namely, after the first virtual object uses the virtual firearm to fire a virtual bullet, when the virtual bullet hits the second virtual object, the available quantity of virtual bullets of the virtual firearm is immediately increased by 1. For example, the available quantity of virtual bullets of the virtual firearm is 3, and when the first virtual object hits the second virtual object after a first shooting instruction, the available quantity of virtual bullets is immediately recovered to 3; and when the first virtual object does not hit the second virtual object after a second shooting instruction, the available quantity of virtual bullets of the virtual firearm is recovered to 3 when the recovery duration of the virtual bullets meets the second duration.

Figure 6:
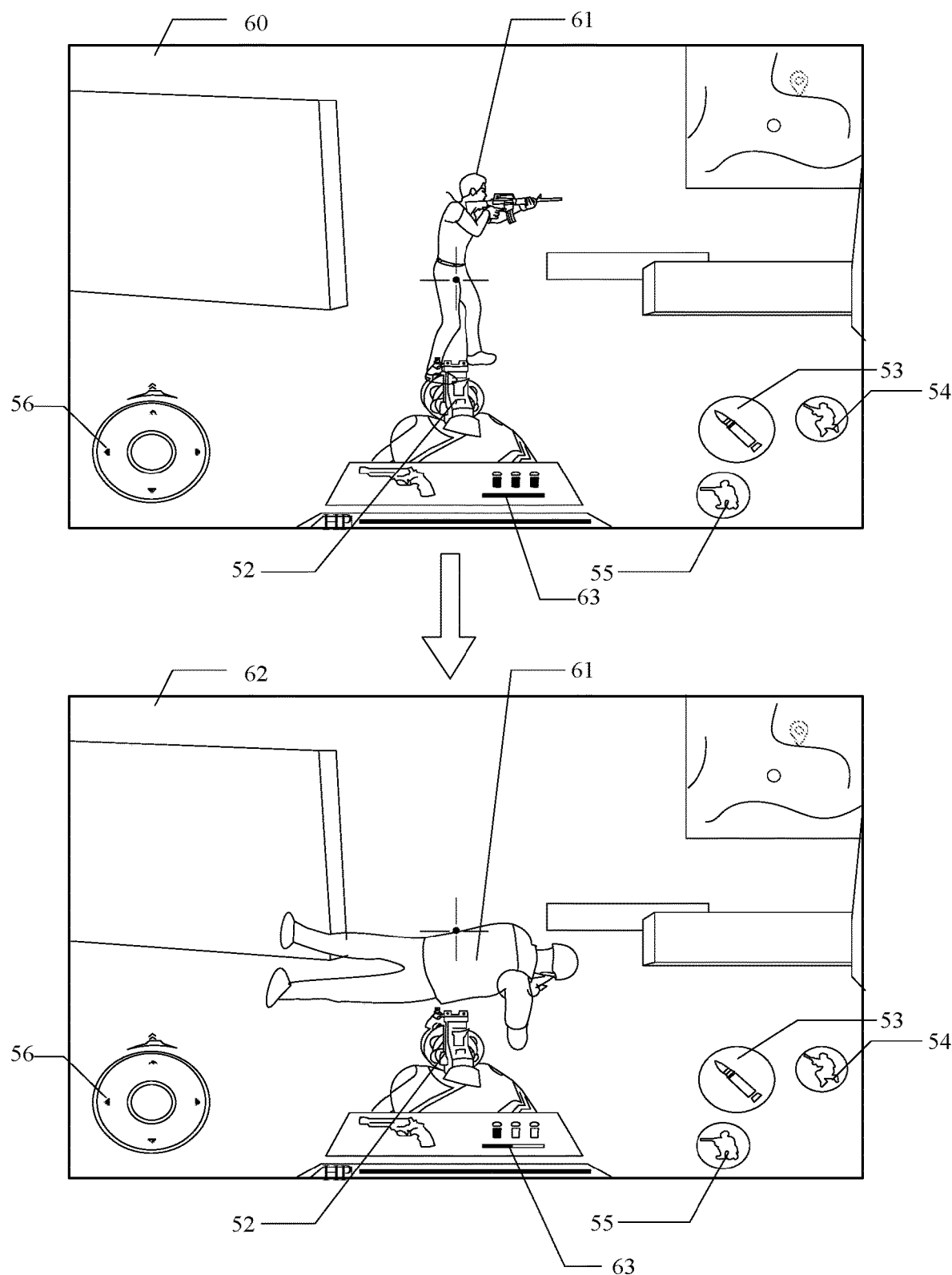
FIG. 6 is an exemplary schematic diagram of another game battle interface.

In some embodiments, a progress icon is displayed in the battle interface during a process of increasing the available quantity of virtual bullets, where the progress icon is used for indicating increment progress of the available quantity of virtual bullets. Exemplarily, referring to FIG. 6, the upper limit value of the available quantity of virtual bullets equipped on the virtual firearm being 3 is used as an example. In the battle interface 60, the available quantity of virtual bullets is 3, and a progress icon 63 is in the form of a full bar at this time. After the first virtual object consumes 3 virtual bullets to kill the second virtual object 61, the available quantity of virtual bullets may be recovered to 1 after the first duration in the battle interface 62, and the form of the progress icon 63 changes with the second duration at this time. In addition, as shown in FIG. 6, the form of a virtual bullet icon may change with the available quantity of virtual bullets. When the available quantity of virtual bullets equipped on the virtual firearm 52 reaches the upper limit value, the available quantity of virtual bullets stops being increased.

In conclusion, in the embodiments of the present disclosure, a recovery duration of virtual bullets is determined according to whether a virtual bullet hits a virtual object. When the virtual object is hit, the recovery duration is relatively short. Therefore, the user is required to have higher shooting accuracy, which helps to enhance the intensity of the game battle.

In addition, the increment progress of the available quantity of virtual bullets is displayed during the process of increasing virtual bullets, which helps the user to determine an increasing time of the available quantity of virtual bullets through the increment progress, thereby making the game more strategic.

In the embodiments of the present disclosure, the client may automatically throw a virtual projectile in the game battle. In some embodiments, a throwing time or throwing location of the virtual projectile may be determined by the server, and the virtual projectile may be used for increasing competitiveness of a virtual object in the game battle. In some embodiments, after the first virtual object obtains the virtual projectile, an obtaining instruction for the virtual projectile may be triggered to be generated, and the client may control the first virtual object to obtain a capability additive effect included in the virtual projectile according to the obtaining instruction, where the capability additive effect is used for increasing a capability value of the first virtual object, for example, shortening the first duration or the second duration, increasing an attack speed or a movement speed, and the like. Certainly, the virtual projectile may alternatively bring a specific gain effect for the virtual object, for example, a stealth skill, teleport skill, or a death-free skill. In other possible implementations, after successfully killing the second virtual object, the first virtual object may alternatively obtain the capability additive effect or the gain effect. In some embodiments, the capability additive effect or the gain effect may have a time limitation, or have no time limitation. A capability effect of the virtual object is increased through the virtual projectile, to improve the intensity of the game battle.

Figure 8:
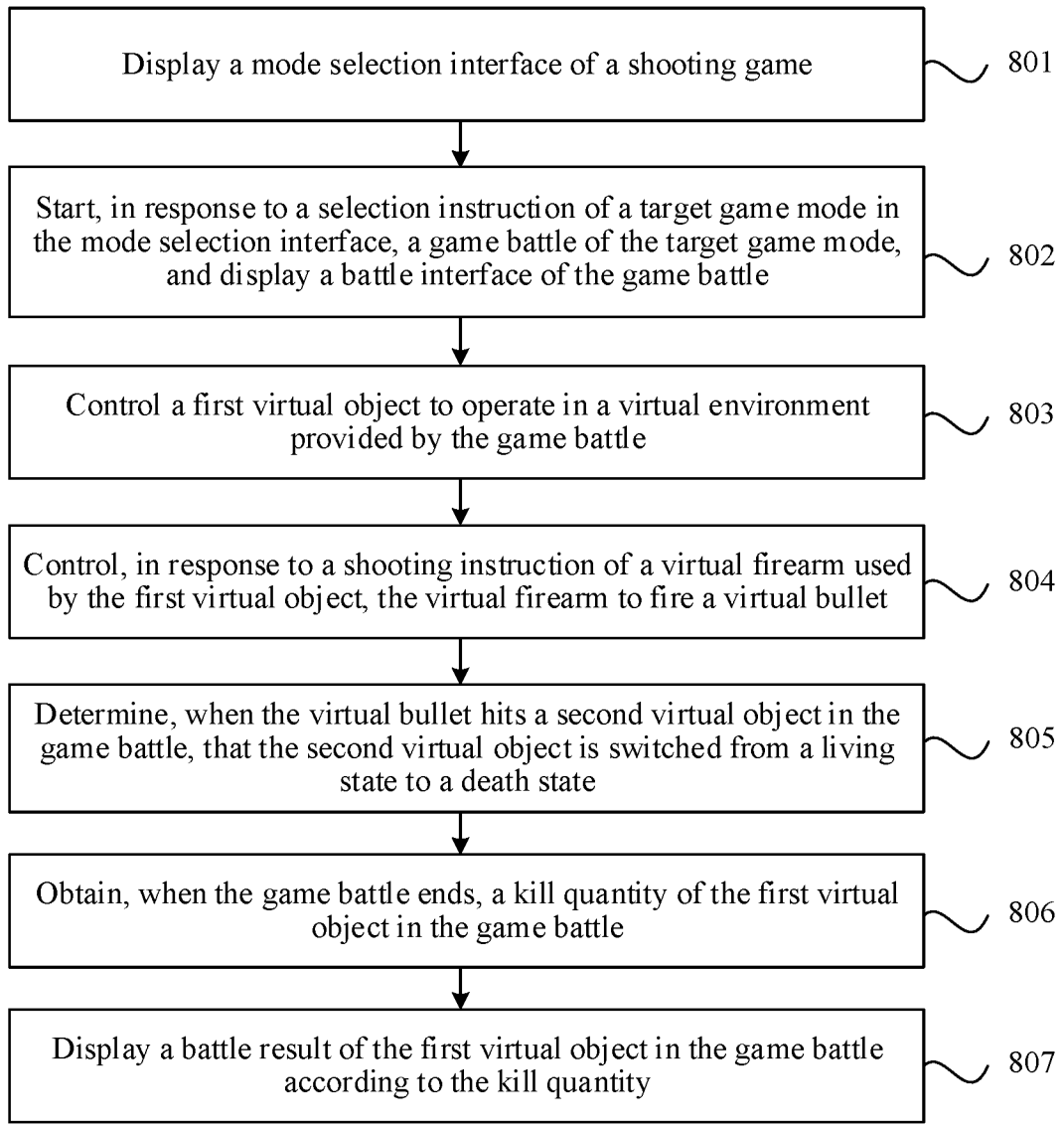
FIG. 8 is a flowchart of a virtual object control method according to another embodiment of the present disclosure.

FIG. 8 shows a flowchart of a virtual object control method according to another embodiment of the present disclosure. The method may be applied to the game running environment of the terminal 10 shown in FIG. 1, for example, an entity executing each step may be a client of the application installed on the terminal 10 (hereinafter referred to as the "client"). The method may include the following steps (801 to 807):

Step 801: Display a mode selection interface of a shooting game.

Step 802: Start, in response to a selection instruction for a target game mode in the mode selection interface, a game battle of the target game mode, and display a battle interface of the game battle.

Step 803: Control a first virtual object to operate in a virtual environment provided by the game battle.

Step 804: Control, in response to a shooting instruction for a virtual firearm used by the first virtual object, the virtual firearm to fire a virtual bullet.

Step 805: Determine, when the virtual bullet hits a second virtual object in the game battle, that the second virtual object is switched from an alive state to a death state.

Steps 801 to 805 are the same as steps 301 to 305 in the embodiment of FIG. 3. For details, refer to description in the embodiment of FIG. 3. Details are not described herein again.

Step 806: Obtain, in response to the end of the game battle, a kill quantity of the first virtual object in the game battle.

The kill quantity refers to a quantity of enemies killed by a virtual object in a game battle. In the embodiments of the present disclosure, the kill quantity refers to a quantity of second virtual objects killed by the first virtual object in the game battle. In some embodiments, when a duration of the game battle reaches a preset threshold, the game battle ends. Further, the client obtains the kill quantity of the first virtual object in the game battle.

Step 807: Display a battle result of the first virtual object in the game battle according to the kill quantity.

In some embodiments, the client may sort kill quantities of all virtual objects in the game battle according to the kill quantities, and display the battle result of the first virtual object in the game battle. The battle result includes the result of sorting. Certainly, the battle result may alternatively include other data of the first virtual object, for example, a hit rate of the first virtual object in the current game battle, a rank of the hit rate of the first virtual object in the current game battle, a capability value of the first virtual object in the current game battle, and a rank of the capability value of the first virtual object in the current game battle.

In the embodiments of the present disclosure, the killed virtual object may be respawned after a preset duration, and the preset duration may be set by the server. Certainly, the killed virtual object may alternatively refuse to be respawned according to actual conditions, which is not limited in the embodiments of the present disclosure.

In conclusion, in the technical solution provided in the embodiments of the present disclosure, when a game battle ends, a battle result is displayed according to a kill quantity, which increases the intensity of the game battle.

Figure 9:
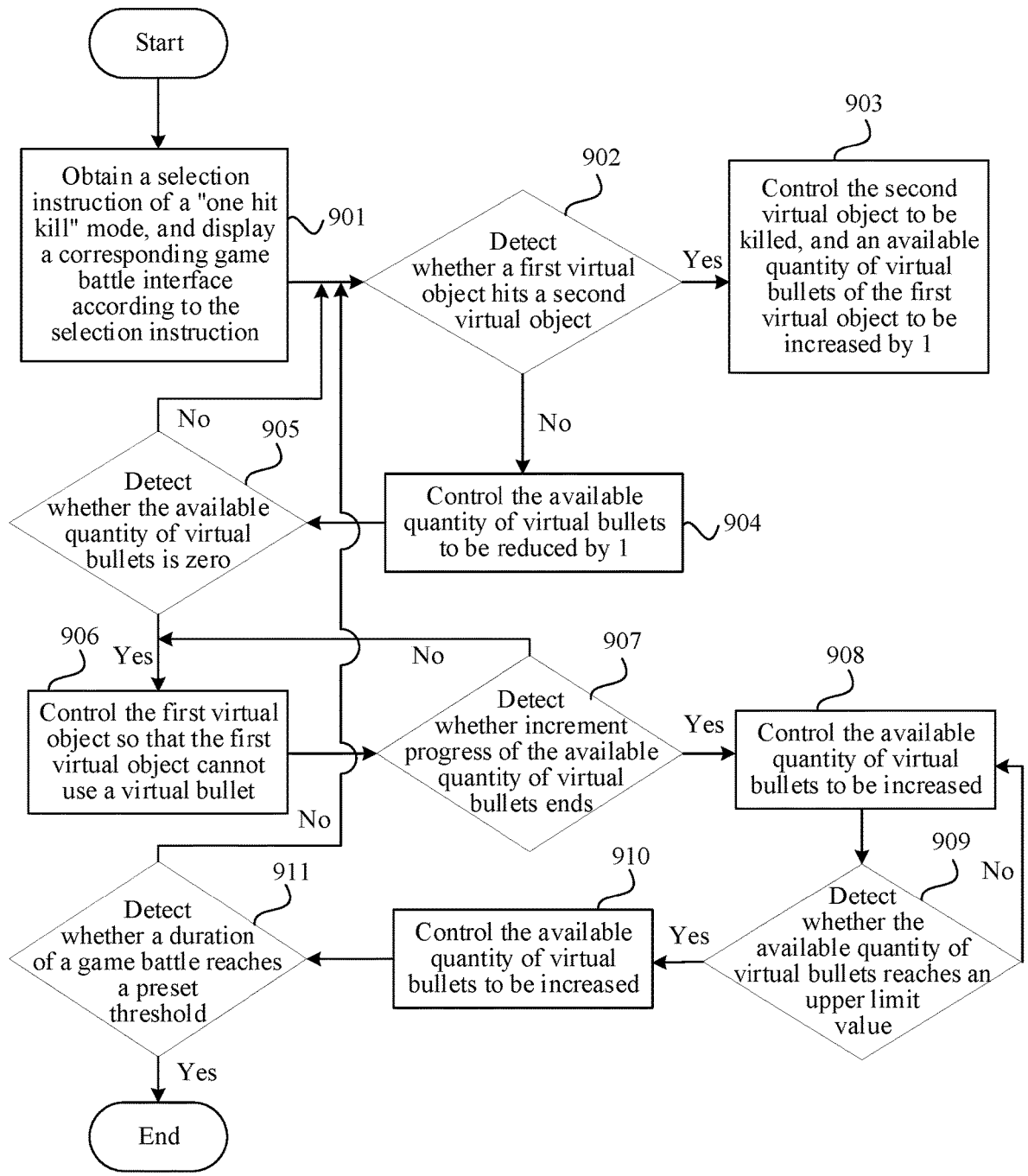
FIG. 9 is an exemplary schematic diagram of a virtual object control method.

Exemplarily, referring to FIG. 9, on the assumption that a game mode provided by the present disclosure is a "one-hit kill" mode, the present disclosure is completely described.

Step 901: A client obtains a selection instruction for a "one-hit kill" mode, and displays a corresponding game battle interface according to the selection instruction.

Step 902: The client detects whether a first virtual object hits a second virtual object. When the first virtual object hits the second virtual object, step 903 is performed; and when the first virtual object does not hit the second virtual object, step 904 is performed.

Step 903: The client controls the second virtual object to be killed, and controls an available quantity of virtual bullets of the first virtual object to be increased by 1.

Step 904: The client controls the available quantity of virtual bullets to be reduced by 1.

Step 905: The client detects whether the available quantity of virtual bullets is zero. When the available quantity of virtual bullets is zero, step 906 is performed; and when the available quantity of virtual bullets is not zero, step 902 is performed.

Step 906: The client controls the first virtual object so that the first virtual object cannot use a virtual bullet.

Step 907: The client detects whether increment progress of the available quantity of virtual bullets ends. When the increment progress of the available quantity of virtual bullets ends, step 908 is performed; and when the increment progress of the available quantity of virtual bullets does not end, step 906 is performed.

Step 908: The client controls the available quantity of virtual bullets to be increased.

Step 909: The client detects whether the available quantity of virtual bullets reaches an upper limit value. When the available quantity of virtual bullets reaches the upper limit value, step 910 is performed; and when the available quantity of virtual bullets does not reach the upper limit value, step 908 is performed.

Step 910: The client controls the available quantity of virtual bullets to stop being increased.

Step 911: The client detects whether a duration of a game battle reaches a preset threshold. When the duration of the game battle reaches the preset threshold, the game ends; and when the duration of the game battle reaches the preset threshold, the game continues.

The following is an apparatus embodiment of the present disclosure, which can be used to perform the method embodiments of the present disclosure. For details not disclosed in the apparatus embodiments of the present disclosure, refer to the method embodiments of the present disclosure.

Figure 10:
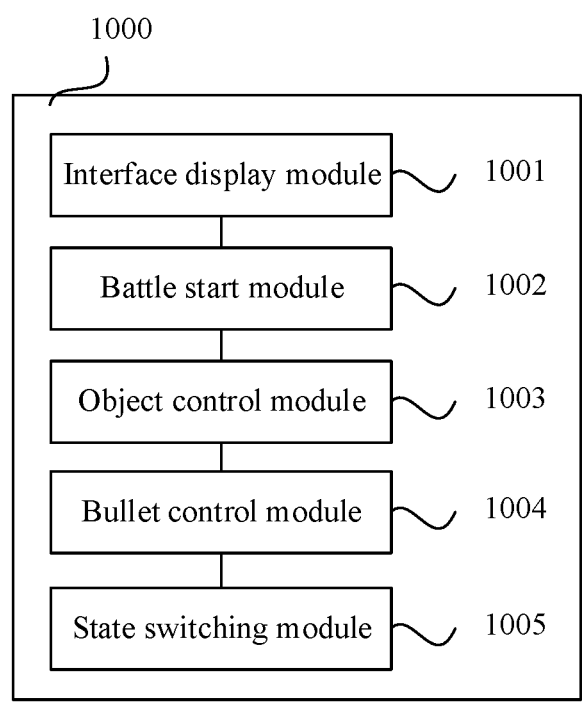
FIG. 10 is a block diagram of a virtual object control apparatus according to an embodiment of the present disclosure.

FIG. 10 shows a block diagram of a virtual object control apparatus according to an embodiment of the present disclosure. The apparatus has a function of realizing the virtual object control method, and the function may be realized by hardware or by hardware executing corresponding software. The apparatus may be a terminal or may be disposed in a terminal. An apparatus 1000 may include: an interface display module 1001, a battle start module 1002, an object control module 1003, a bullet control module 1004, and a state switching module 1005.

The interface display module 1001 is configured to display a mode selection interface of a shooting game, the mode selection interface including at least one game mode.

The battle start module 1002 is configured to start, in response to a selection instruction for a target game mode in the mode selection interface, a game battle of the target game mode, and display a battle interface of the game battle.

The object control module 1003 is configured to control a first virtual object to operate in a virtual environment provided by the game battle.

The bullet control module 1004 is configured to control, in response to a shooting instruction for a virtual firearm used by the first virtual object, the virtual firearm to fire a virtual bullet, a damage value of the virtual bullet being greater than or equal to a hit point value of a virtual object in the game battle.

The state switching module 1005 is configured to determine, when the virtual bullet hits a second virtual object in the game battle, that the second virtual object is switched from an alive state to a death state.

In an exemplary embodiment, the bullet control module 1004 is configured to control, when the virtual bullet hits a second virtual object in the game battle, an available quantity of virtual bullets equipped on the virtual firearm to be increased by a first value after a first duration; and control, when the virtual bullet does not hit the second virtual object in the game battle, the available quantity of virtual bullets equipped on the virtual firearm to be increased by a second value after a second duration, where the first duration is less than the second duration.

Figure 11:
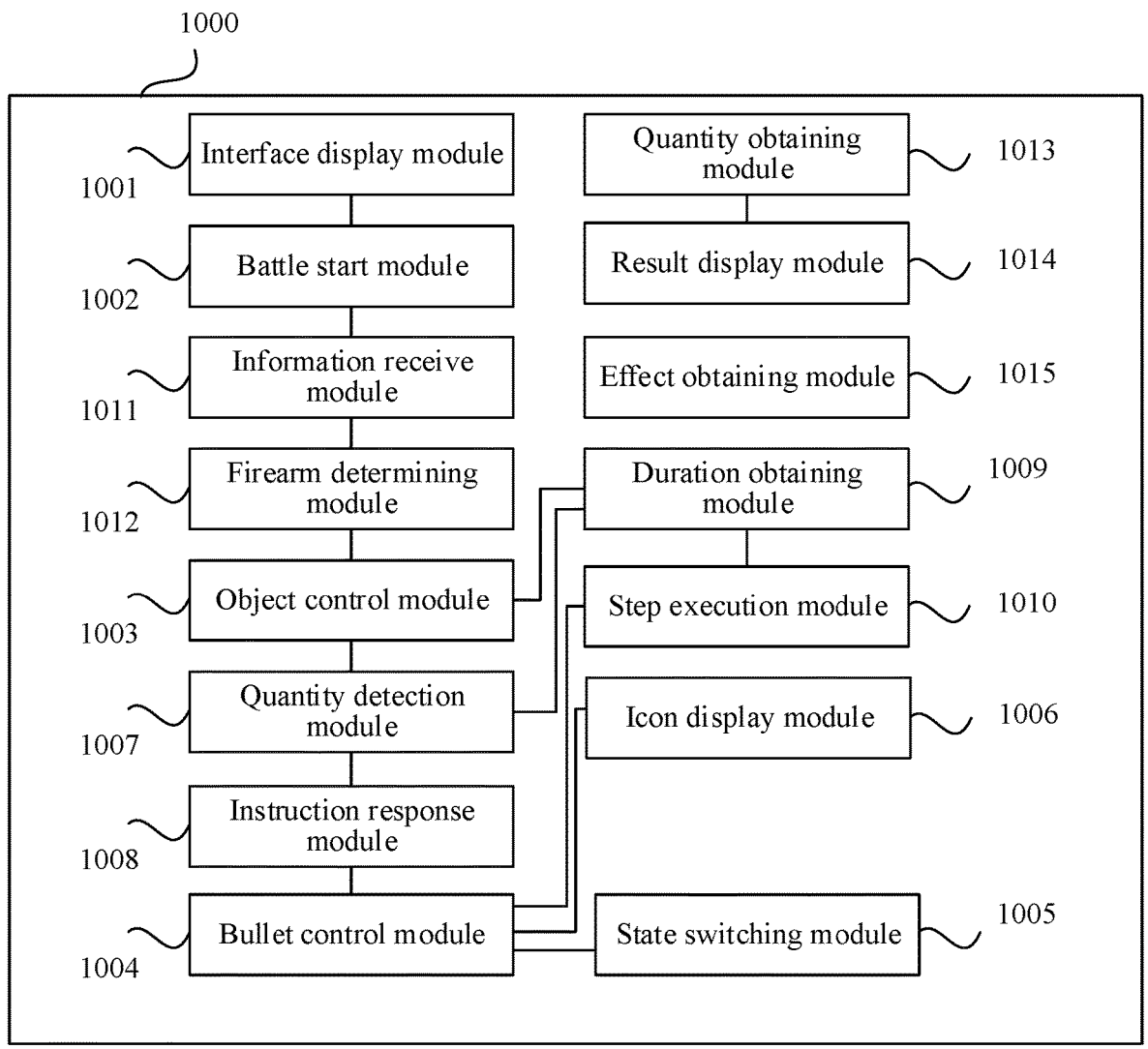
FIG. 11 is a block diagram of a virtual object control apparatus according to another embodiment of the present disclosure.

In an exemplary embodiment, as shown in FIG. 11, the apparatus 1000 further includes: an icon display module 1006.

The icon display module 1006 is configured to display a progress icon in the battle interface during a process of increasing the available quantity of virtual bullets, where the progress icon is used for indicating increment progress of the available quantity of virtual bullets.

In an exemplary embodiment, as shown in FIG. 11, the apparatus 1000 further includes: a quantity detection module 1007 and an instruction response module 1008.

The quantity detection module 1007 is configured to detect whether the available quantity of virtual bullets is zero after the shooting instruction is received.

The instruction response module 1008 is configured to respond to the shooting instruction when the available quantity of virtual bullets is not zero.

In an exemplary embodiment, as shown in FIG. 11, the apparatus 1000 further includes: a duration obtaining module 1009 and a step execution module 1010.

The duration obtaining module 1009 is configured to obtain an interval duration between a moment at which the shooting instruction is received and a moment at which a previous virtual bullet is fired; and The step execution module 1010 is configured to perform the step of the responding to the shooting instruction when the interval duration is greater than a preset duration.

In an exemplary embodiment, as shown in FIG. 11, the apparatus 1000 further includes: an information receiving module 1011 and a firearm determining module 1012.

The information receiving module 1011 is configured to receive firearm configuration information transmitted by a server, where the firearm configuration information is used for configuring the virtual firearm used by the first virtual object in the game battle.

The firearm determining module 1012 is configured to determine the virtual firearm used by the first virtual object according to the firearm configuration information.

In an exemplary embodiment, each virtual object in the game battle is configured to use the same virtual firearm; or, at least two virtual objects in the game battle are configured to use different virtual firearms.

In an exemplary embodiment, as shown in FIG. 11, the apparatus 1000 further includes: a quantity obtaining module 1013 and a result display module 1014.

The quantity obtaining module 1013 is configured to obtain, in response to the end of the game battle, a kill quantity of the first virtual object in the game battle.

The result display module 1014 is configured to display a battle result of the first virtual object in the game battle according to the kill quantity.

In an exemplary embodiment, as shown in FIG. 11, the apparatus 1000 further includes: an effect obtaining module 1015.

The effect obtaining module 1015 is configured to control, in response to an obtaining instruction of the first virtual object for a virtual projectile, the first virtual object to obtain a capability additive effect included in the virtual projectile, where the capability additive effect is used for increasing a capability value of the first virtual object.

In an exemplary embodiment, the bullet control module 1004 is further configured to control, after the virtual bullet hits the second virtual object, the virtual bullet to penetrate the second virtual object, to continuously move in a designated direction; and control the virtual bullet to stop moving when a moving state of the virtual bullet meets a condition.

In conclusion, in the technical solution provided in the embodiments of the present disclosure, after entering a game battle of a target game mode, when a virtual bullet fired by a virtual firearm used by a first virtual object hits a second virtual object, it is determined that the second virtual object is switched from an alive state to a death state. In this way, a product function of killing by one shot is achieved, which helps to improve kill efficiency in the game battle, speed up game process, and reduce a game battle duration, thereby reducing a processing overhead of a server.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 12:
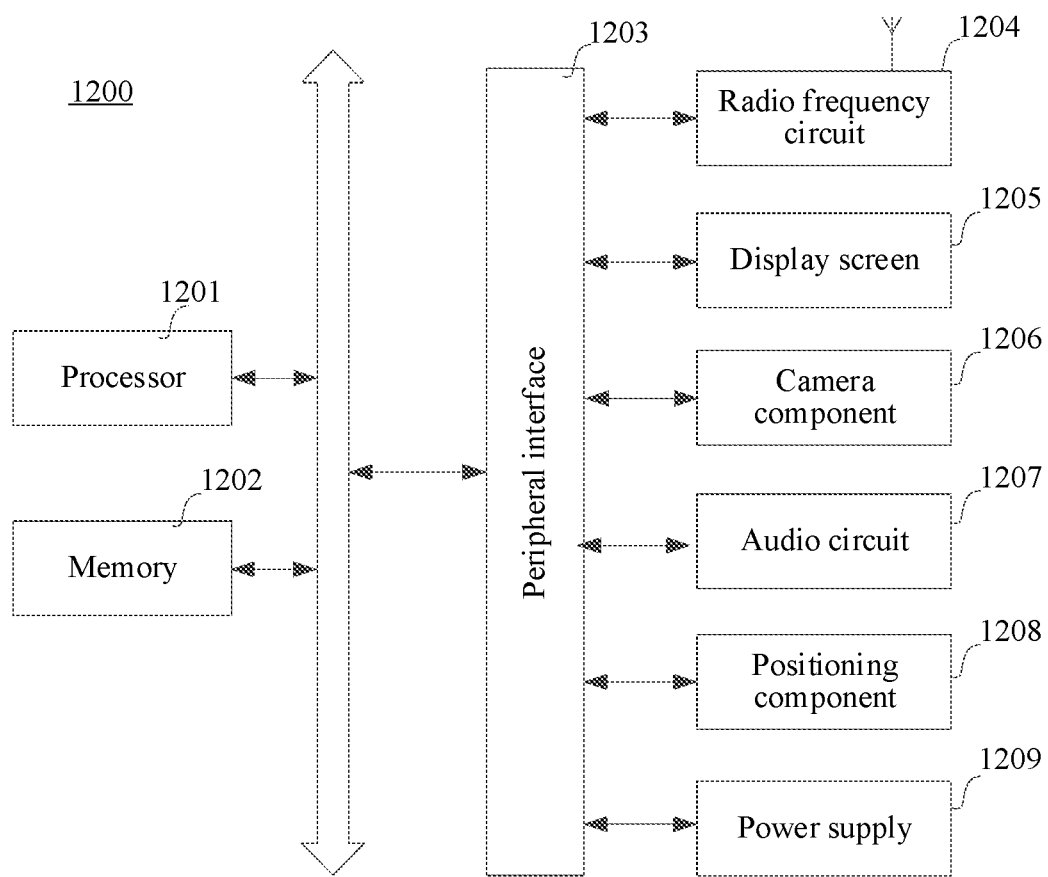
FIG. 12 is a structural block diagram of a terminal according to an embodiment of the present disclosure.

FIG. 12 shows a structural block diagram of a terminal 1200 according to an embodiment of the present disclosure. The terminal 1200 may be an electronic device, for example, a mobile phone, a tablet computer, a game console, an e-book reader, a multimedia player, a wearable device, a PC, or the like. The terminal is configured to implement the virtual object control method provided in the foregoing embodiments. The terminal may be the terminal 10 in the game running environment shown in FIG. 1.

Generally, the terminal 1200 includes a processor 1201 and a memory 1202.

The processor 1201 may include one or more processing cores. For example, the processor 1201 may be a 4-core processor or an 8-core processor. The processor 1201 may be implemented by using at least one hardware form of a digital signal processor (DSP), a field programmable gate array (FPGA), and a programmable logic array (PLA). The processor 1201 may alternatively include a main processor and a coprocessor. The main processor is configured to process data in an active state, also referred to as a central processing unit (CPU). The coprocessor is a low-power processor configured to process data in a standby state. In some embodiments, the processor 1201 may be integrated with a graphics processing unit (GPU). The GPU is configured to render and draw content that needs to be displayed on a display. In some embodiments, the processor 1201 may further include an AI processor. The AI processor is configured to process computing operations related to ML.

The memory 1202 may include one or more computer-readable storage media that may be non-transitory. The memory 1202 may further include a high-speed random access memory, and a non-volatile memory such as one or more magnetic disk storage devices and a flash storage device. In some embodiments, the non-transient computer-readable storage medium in the memory 1202 is configured to store at least one instruction, at least one program, a code set, or an instruction set, the at least one instruction, the at least one program, the code set, or the instruction set being configured to be executed by one or more processors to implement the virtual object control method.

In some embodiments, the terminal 1200 may optionally include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral includes: at least one of a radio frequency (RF) circuit 1204, a display screen 1205, a camera component 1207, an audio circuit 1207, a positioning component 1208, and a power supply 1209.

A person skilled in the art may understand that the structure shown in FIG. 12 does not constitute a limitation to the terminal 1200, and the terminal may include more or fewer components than those shown in the figure, or some components may be combined, or a different component deployment may be used.

In an exemplary embodiment, a computer-readable storage medium is further provided, storing at least one instruction, at least one program, a code set, or an instruction set, the at least one instruction, the at least one program, the code set, or the instruction set, when executed by a processor, implementing the virtual object control method.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product is further provided, the computer program product, when executed by a processor, being used for implementing the virtual object control method.

"Plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A virtual object control method, performed by a terminal comprising a processor coupled to a display screen, the method comprising:
 displaying, by the processor, a mode selection interface of a shooting game on the display screen, the mode selection interface comprising at least one game mode;
 starting, in response to a selection instruction for a target game mode in the mode selection interface, a game battle of the target game mode, and displaying a battle interface of the game battle on the display screen;
 controlling, by the processor, a first virtual object to operate in a virtual environment provided by the game battle;
 controlling, in response to a shooting instruction for a virtual firearm used by the first virtual object, the virtual firearm to fire a virtual bullet, a damage value of the virtual bullet being greater than or equal to a hit point value of a virtual object in the game battle;
 increasing, by the processor, an available quantity of virtual bullets equipped on the virtual firearm after different durations based on whether the virtual bullet hits a second virtual object in the game battle, comprising:
  in response to the virtual bullet hits the second virtual object, determining that the second virtual object is switched from an alive state to a death state and increasing the available quantity by a first value after a first duration; and
  in response to the virtual bullet does not hit the second virtual object, increasing the available quantity of virtual bullets equipped on the virtual firearm by a second value after a second duration that is longer than the first duration; and
 displaying, by the processor, a progress bar in the battle interface on the display screen during a process of increasing the available quantity of virtual bullets, wherein the progress bar indicates incremental progress of the available quantity of virtual bullets.

2. The method according to claim 1, further comprising:
 detecting whether the available quantity of virtual bullets is zero after the shooting instruction is received; and
 responding to the shooting instruction when the available quantity of virtual bullets is not zero.

3. The method according to claim 2, wherein before the responding to the shooting instruction, the method further comprises:
 obtaining an interval duration between a moment at which the shooting instruction is received and a moment at which a previous virtual bullet is fired; and
 performing the operation of responding to the shooting instruction when the interval duration is greater than a preset duration.

4. The method according to claim 1, wherein after the starting a game battle of the target game mode, the method further comprises:
 receiving firearm configuration information transmitted by a server, wherein the firearm configuration information is used for configuring the virtual firearm used by the first virtual object in the game battle; and
 determining the virtual firearm used by the first virtual object according to the firearm configuration information.

5. The method according to claim 4, wherein
 each virtual object in the game battle is configured to use the same virtual firearm;
 or,
 at least two virtual objects in the game battle are configured to use different virtual firearms.

6. The method according to claim 1, further comprising:
 obtaining, when the game battle ends, a kill quantity of the first virtual object in the game battle; and
 displaying a battle result of the first virtual object in the game battle according to the kill quantity.

7. The method according to claim 1, further comprising:
 controlling, in response to an obtaining instruction of the first virtual object for a virtual projectile, the first virtual object to obtain a capability additive effect comprised in the virtual projectile, wherein
 the capability additive effect is used for increasing a capability value of the first virtual object.

8. The method according to claim 1, further comprising:
 controlling, after the virtual bullet hits the second virtual object, the virtual bullet to penetrate the second virtual object, to continuously move in a designated direction; and
 controlling the virtual bullet to stop moving when a moving state of the virtual bullet meets a condition.

9. The method according to claim 8, wherein controlling the virtual bullet to stop moving when a moving state of the virtual bullet meets a condition comprises:
 controlling the virtual bullet to stop moving in response to detecting that the virtual bullet has flew and reached a preset distance after the virtual bullet hits the second virtual object.

10. The method according to claim 9, wherein controlling the virtual bullet to stop moving when a moving state of the virtual bullet meets a condition comprises:
 controlling the virtual bullet to stop moving in response to detecting that the virtual bullet hits a virtual obstacle within the preset distance and
 controlling the virtual bullet to stop moving in response to the virtual bullet hitting additional n second virtual objects within the preset distance, n being a positive integer.

11. The method according to claim 1, further comprising:
 transmitting a detection ray from a designated position from which the virtual bullet is fired, wherein a trajectory of the detection ray overlaps with a movement trajectory of the virtual bullet; and
 determining whether the virtual bullet hits the second virtual object in the game battle by determining whether the detection ray intersects a collision box of the second virtual object.

12. The method according to claim 1, wherein the first duration is 0.

13. A virtual object control apparatus, comprising a processor coupled to a display screen, and a memory; one or more programs being stored in the memory, the processor being configured, when executing the one or more programs, to:
 display a mode selection interface of a shooting game on the display screen, the mode selection interface comprising at least one game mode;
 start, in response to a selection instruction for a target game mode in the mode selection interface, a game battle of the target game mode, and display a battle interface of the game battle on the display screen;
 control a first virtual object to operate in a virtual environment provided by the game battle;

control, in response to a shooting instruction for a virtual firearm used by the first virtual object, the virtual firearm to fire a virtual bullet, a damage value of the virtual bullet being greater than or equal to a hit point value of a virtual object in the game battle;

increase an available quantity of virtual bullets equipped on the virtual firearm after different durations based on whether the virtual bullet hits a second virtual object in the game battle, comprising:

in response to the virtual bullet hits the second virtual object, determining that the second virtual object is switched from an alive state to a death state and increasing the available quantity by a first value after a first duration; and;

in response to the virtual bullet does not hit the second virtual object, increasing the available quantity of virtual bullets equipped on the virtual firearm by a second value after a second duration that is longer than the first duration; and display a progress bar in the battle interface on the display screen during a process of increasing the available quantity of virtual bullets, wherein the progress bar indicates incremental progress of the available quantity of virtual bullets.

14. The apparatus according to claim 13, wherein the processor is further configured to:

detect whether the available quantity of virtual bullets is zero after the shooting instruction is received; and respond to the shooting instruction when the available quantity of virtual bullets is not zero.

15. The apparatus according to claim 14, wherein before responding to the shooting instruction, the processor is further configured to:

obtain an interval duration between a moment at which the shooting instruction is received and a moment at which a previous virtual bullet is fired; and perform the operation of responding to the shooting instruction when the interval duration is greater than a preset duration.

16. The apparatus according to claim 13, wherein after starting the game battle of the target game mode, the processor is further configured to:

receive firearm configuration information transmitted by a server, wherein the firearm configuration information is used for configuring the virtual firearm used by the first virtual object in the game battle; and determine the virtual firearm used by the first virtual object according to the firearm configuration information.

17. The apparatus according to claim 16, wherein each virtual object in the game battle is configured to use the same virtual firearm;

or, at least two virtual objects in the game battle are configured to use different virtual firearms.

18. The apparatus according to claim 13, wherein the processor is further configured to:

obtain, when the game battle ends, a kill quantity of the first virtual object in the game battle; and display a battle result of the first virtual object in the game battle according to the kill quantity.

19. The apparatus according to claim 13, wherein the processor is further configured to:

control, in response to an obtaining instruction of the first virtual object for a virtual projectile, the first virtual object to obtain a capability additive effect comprised in the virtual projectile, wherein the capability additive effect is used for increasing a capability value of the first virtual object.

20. A non-transitory computer-readable storage medium, storing at least one instruction, at least one program, a code set, or an instruction set, the at least one instruction, the at least one program, the code set, or the instruction set being loaded and executed by a processor coupled to a display screen to implement:

displaying a mode selection interface of a shooting game on the display screen, the mode selection interface comprising at least one game mode;

starting, in response to a selection instruction for a target game mode in the mode selection interface, a game battle of the target game mode, and displaying a battle interface of the game battle on the display screen;

controlling a first virtual object to operate in a virtual environment provided by the game battle;

controlling, in response to a shooting instruction for a virtual firearm used by the first virtual object, the virtual firearm to fire a virtual bullet, a damage value of the virtual bullet being greater than or equal to a hit point value of a virtual object in the game battle;

increasing an available quantity of virtual bullets equipped on the virtual firearm after different durations based on whether the virtual bullet hits a second virtual object in the game battle, comprising:

in response to the virtual bullet hits the second virtual object, determining that the second virtual object is switched from an alive state to a death state and increasing the available quantity by a first value after a first duration; and in response to the virtual bullet does not hit the second virtual object, increasing the available quantity of virtual bullets equipped on the virtual firearm by a second value after a second duration that is longer than the first duration; and displaying a progress bar in the battle interface on the display screen during a process of increasing the available quantity of virtual bullets, wherein the progress bar indicates incremental progress of the available quantity of virtual bullets.

* * * * *